July 29, 1930.  C. H. BERILL  1,771,703
WINDSHIELD WIPER
Original Filed July 19, 1927   3 Sheets-Sheet 1

Inventor
C. H. Berill.

By Lacey & Lacey, Attorneys

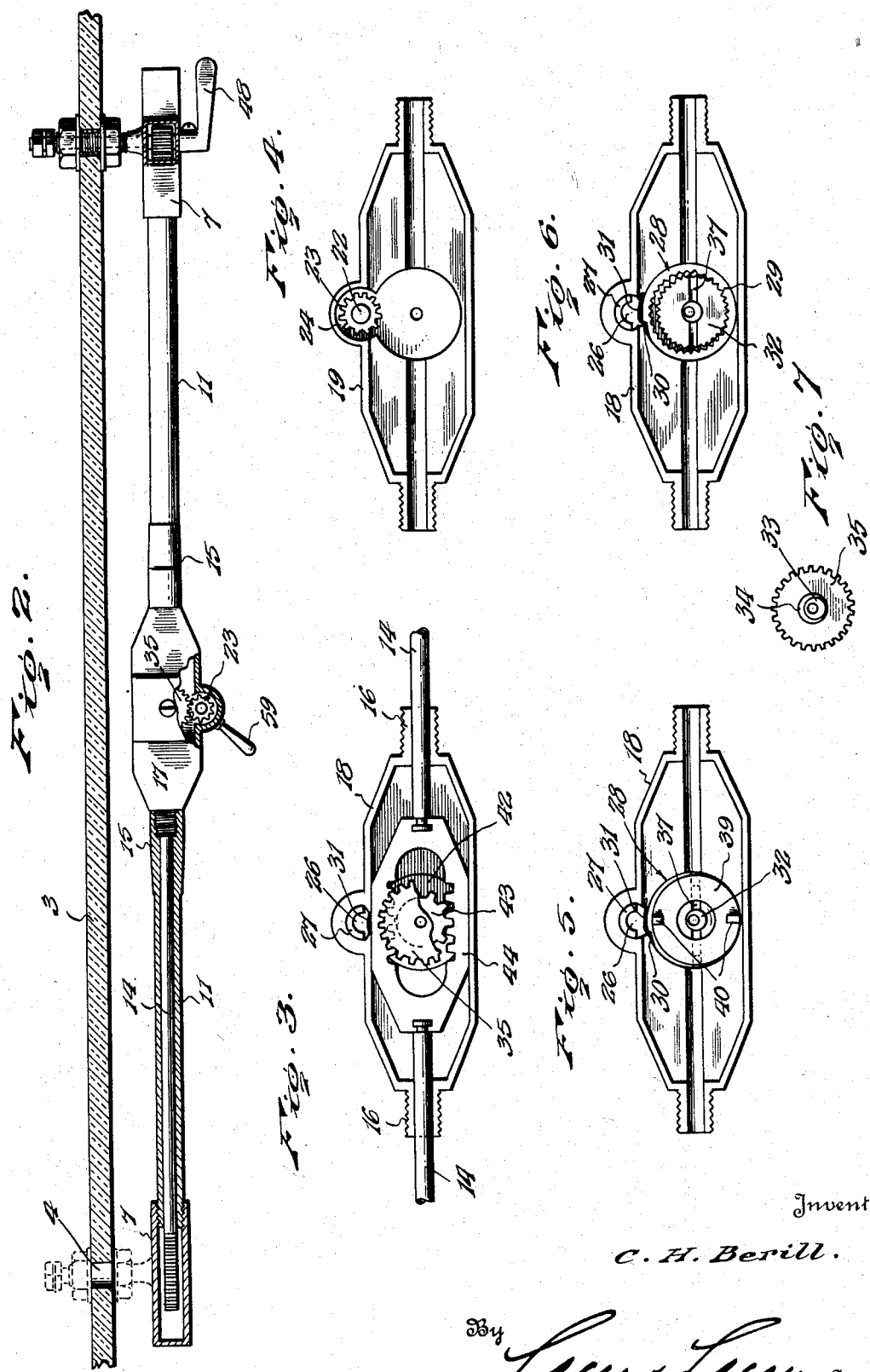

July 29, 1930.   C. H. BERILL   1,771,703
WINDSHIELD WIPER
Original Filed July 19, 1927   3 Sheets-Sheet 3
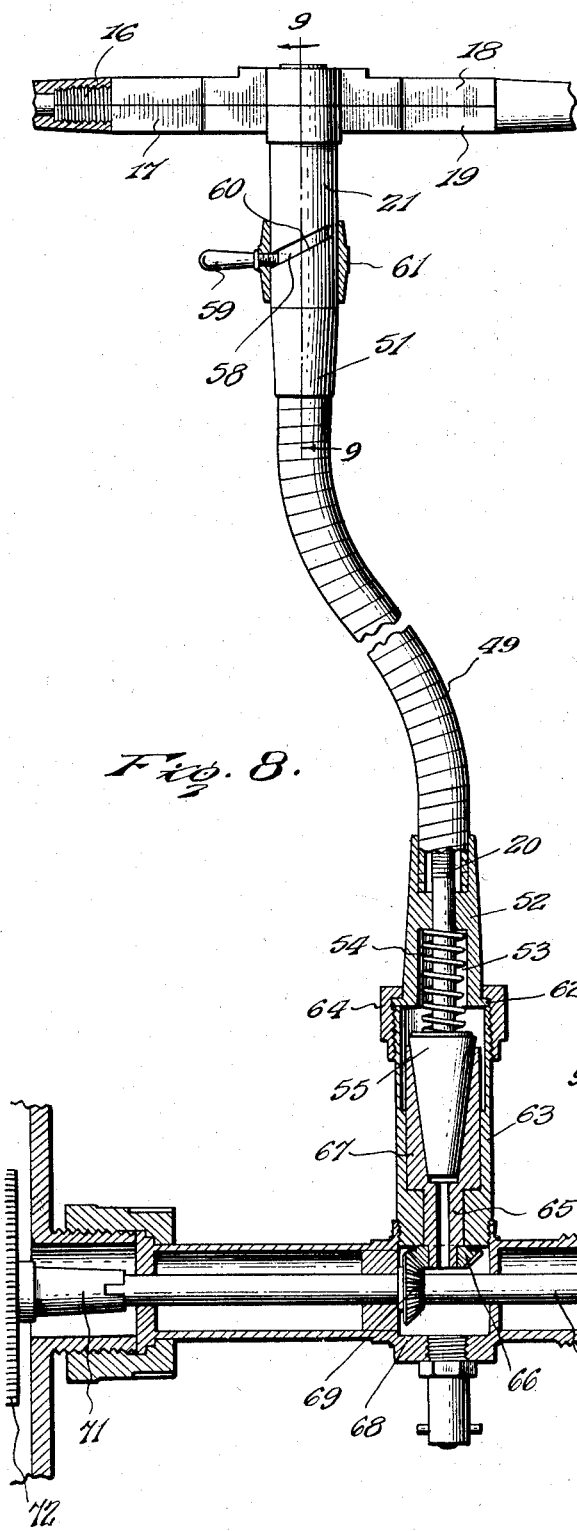
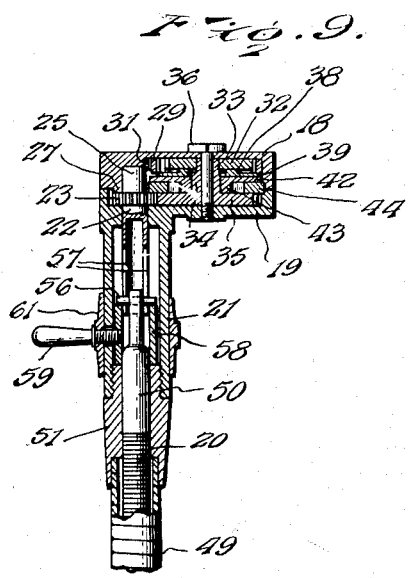
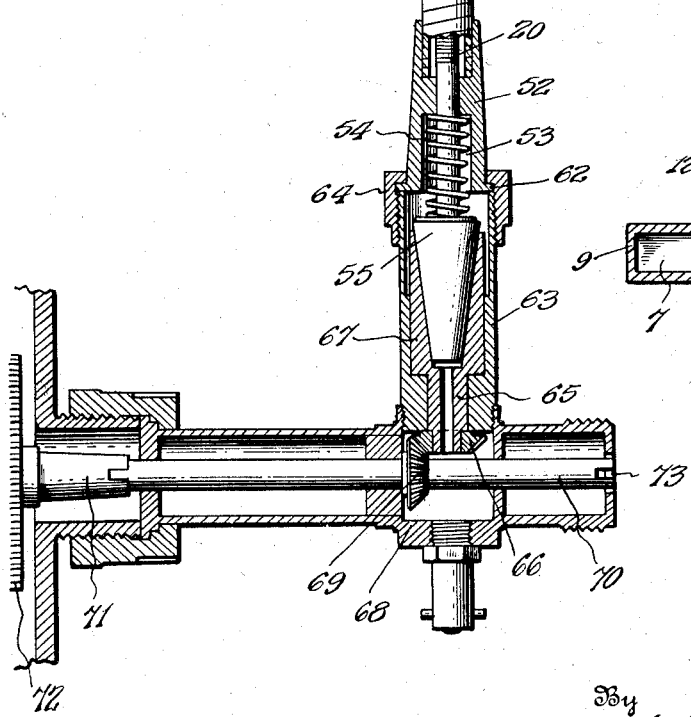
Inventor
C. H. Berill.
By Lacey & Lacey, Attorneys Patented July 29, 1930

1,771,703

UNITED STATES PATENT OFFICE

CARROLL H. BERILL, OF NEW YORK, N. Y.

WINDSHIELD WIPER

Application filed July 19, 1927, Serial No. 206,960. Renewed December 26, 1929.

This invention relates to mechanically operated windshield wipers, and the objects of the invention are to provide a double wiper which will clean substantially the entire area of the windshield with the arcs of the cleaning elements extending upwardly thereby maintaining a clear field of vision for the operator; to provide a wiper which will simultaneously clean the outer face of the windshield at both sides of the same; to provide a windshield wiper of very compact form which will occupy no appreciable space on the windshield and will not obstruct the view of the driver or passengers or interfere with any of the instruments upon the instrument board or the other operating elements of the car; to provide novel means for throwing the wiper into or out of operation; to provide a mechanism which may be quickly installed upon any car equipped with a speedometer and which will require only a short length of flexible drive, and to provide a driving mechanism of such character that the wiper may be operated by hand if desired. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Fig. 2 is an enlarged section on the line 2—2 of Fig. 1;

Fig. 3 is an enlarged view of the main operating mechanism with the lower member or face plate of the casing removed and parts partly broken away;

Fig. 4 is a top plan view of the lower member or face plate with the main actuating pinion in place;

Fig. 5 is a view similar to Fig. 3 with the main driving gear, the rack and the rack actuating segment removed;

Fig. 6 is a view showing the lower face of the upper member or face plate or the casing with the ring gear and the loose pinion in position;

Fig. 7 is a detail plan view of the main driving gear with the eccentric or cam thereon;

Fig. 8 is an enlarged sectional elevation of the driving shaft and its connections with the transmission of the vehicle, this view particularly illustrating the clutch whereby the driving shaft is held in engagement with the driving gear;

Fig. 9 is an enlarged section on the line 9—9 of Fig. 8;

Fig. 11 is a longitudinal section showing the means whereby motion is imparted directly to the windshield wiper rocking shaft.

Figure 1:
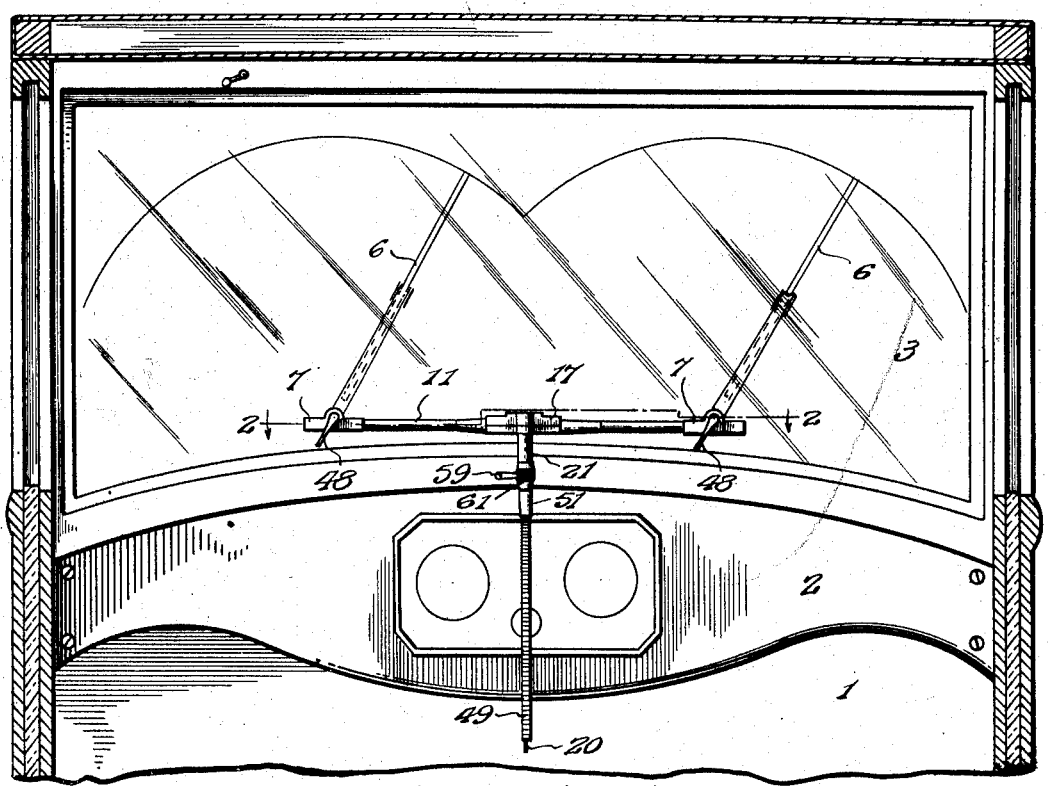
Figure 1 is a view, partly in elevation and partly in section, showing my improved windshield wiper mounted upon the windshield of an automobile.

In the drawings, the reference numeral 1 indicates a portion of an automobile body showing the instrument board 2 and the windshield 3 which are of the usual construction. In carrying out the present invention, openings 4 are formed through the windshield at opposite sides of the vertical center thereof and near the lower edge of the same to receive rock shafts 5 carrying the wipers 6. As shown in Fig. 1, the wipers extend upwardly from the wiper shafts when in use and they oscillate about the axes of the respective rock shafts so that a space is cleared on the windshield through the lower portion of the same. It is now the general practice to mount windshield wipers on the upper lintel or frame bar of the windshield and the wipers depend from the wiper shafts so that arcs described by the free ends of the wipers define downwardly dipping curves and clear spaces in the upper portions of the windshields, leaving the vision of the windshield below the arcs and at the sides of the same dim, the result being that, in order to obtain the desired clear view of the road ahead, the operator is obliged to shift his head in order to bring his line of vision into the space above the arc defined by the wiper. With my present arrangement, however, as shown clearly in Fig. 1, the arcs are extended upwardly and the uncleared space or dim field of the windshield is all above the line of vision, and the operator or passenger has a clear view ahead without shifting his position in the slightest degree. The wipers may be of any approved form and secured to the wiper shafts in the usual manner and a detailed description of the wiper and its mounting is, therefore, deemed unnecessary.

The rear end portion of each wiper shaft is journaled in a casing 7 which has an approximately semi-cylindrical pocket on its upper side, as shown at 8, and is closed at its outer end 9 while its inner end 10 is threaded onto the outer end of a sleeve 11 which extends inwardly therefrom. A pinion 12 is secured upon the rear end of the wiper shaft, and this pinion meshes with a rack 13 formed on the upper side of a rod 14 which is mounted closely but slidably within the sleeve 11 and extends entirely through the same. The inner end of each sleeve 11 is enlarged somewhat, as indicated at 15, and is threaded onto a boss 16 at the adjacent end of the inner main casing 17. As shown in the drawings, the casing 17 consists of two mating members 18 and 19 and the bosses 16 are formed in halves each integral with the end of one member of the casing. The casing is disposed horizontally adjacent the lower edge of the windshield and at the inner or rear side of the same, as will be understood upon reference to Figs. 1 and 2, and the mechanism whereby motion is imparted to the wipers is housed within this casing and operated by a shaft 20 extending downwardly over the instrument board and operatively connected at its lower end with the transmission gearing of the automobile, as shown in Figure 8, and as will be presently more fully set forth.

Figure 10:
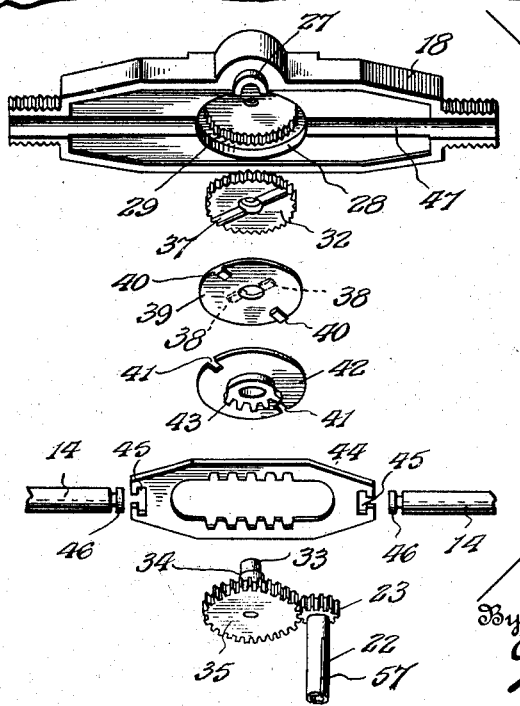
Fig. 10 is a view showing the parts of the main driving mechanism in perspective and disassembled but in their proper relative positions.

The lower casing member has a bearing sleeve 21 formed integral therewith and depending therefrom and, axially alined with the said sleeve, an opening is formed through the bottom of said casing member to receive a hollow shaft 22 carrying a pinion 23 on its upper end, the pinion playing directly over the bottom of the casing member and within a circular recess 24 formed therein while the end of the shaft, as shown at 25 in Fig. 9, extends above the pinion and operates in a recess 26 provided therefor in the upper casing member 18. A semi-circular rib 27 is formed on the lower side of this upper casing section 18 concentric with the recess 26 so as to bear upon the pinion 23 with sufficient force to hold it to its seat but avoid unnecessary friction. In the top of the casing member 18, at the center thereof, is a circular recess 28 which at one point intersects the recess 26, and in the said recess 28 is fitted an internal gear ring 29 provided in its periphery with a notch 30 adapted to be engaged by a spring detent 31 which is secured in the body of the member 18 and extends peripherally over the ring gear, as shown most clearly in Figs. 5 and 6. Obviously, this detent will resist movement of the gear ring to the left in Figs. 5 and 6 but will permit movement of the same to the right. Disposed loosely within the ring gear is a pinion 32 which has one tooth less than the ring gear, the particular relation which I have found advantageous being fifty teeth on the ring gear and forty-nine on the pinion. The pinion has a central circular opening in which is fitted closely an eccentric 33 on the upper end of a spindle 34 which is fixed to or formed integral with the main spur gear 35 which rests upon the bottom of the casing member 19 and meshes with the driving pinion 23, as shown in Fig. 9. The parts described are maintained in proper position within the casing and the members of the casing are held together by a screw or bolt 36 which is inserted centrally through the spindle 34 on the gear 35 and alined openings in the casing members 18 and 19 and has threaded engagement with the member 19, as clearly shown in Fig. 9. The pinion 32 is provided in its lower face with a diametrical groove 37, and this groove receives lugs 38 formed on the upper face of a disk 39 which is fitted loosely upon the spindle 34 so that it will rotate with the pinion 32 in an obvious manner, and, at right angles to the lugs 38, on the under face of the disk are lugs 40 which, in turn, are adapted to fit within notches 41 formed at diametrically opposite points in the peripheral edge of a disk 42 which is disposed between the disk 39 and the gear 35 and is provided on its under face centrally with a segmental gear 43. Spanning the segment 43 and partly supported by the gear 35 and partly supported by grooves provided therefor in the wall of the mating casing members 18, 19 is an elliptical internal rack 44 which in the operation of the device is engaged by the segment 43 to be reciprocated and impart motion to the wiper shafts. Referring more particularly to Fig. 10, it will be noted that T-shaped notches or slots 45 are formed in the ends of the rack and T heads 46 are formed at the inner ends of the rods 14 to engage within these T-shaped notches so that the rods will be caused to move with the rack, and, to accommodate the rods and maintain them in proper engagement with the rack and aid the sleeves 11 in preventing bending of the rods, longitudinal grooves, as 47, are provided in the meeting faces of the casing members.

As shown in Figs. 1 and 2, a lever handle or knob 48 is secured to the inner or rear end of each wiper shaft so that the wiper may, if desired, be operated by hand.

The driving shaft 20 is a flexible shaft of well known type and is slidably and rotatably mounted in a flexible sheath 49, the upper end 50 of the driving shaft being disposed axially in a coupling sleeve or collar 51 which is threaded into the lower end of the bearing sleeve 21 and has its lower end secured firmly to the upper end of the sheath 49, as shown most clearly in Fig. 9, while the lower end of the driving shaft extends within a coupling sleeve 52 which is secured to the lower end of the sheath 49 and has an axial recess 53 in its lower end, the said recess accommodating a spring 54 which is coiled around the lower end of the driving shaft and bears at one end against the top of the recess and at its opposite end upon the head of a clutch cone 55 which is fixed to the lower end of the shaft. The upper end of the shaft fits within the hollow shaft 22 and is equipped with a pin or stud 56 which slidably engage slots 57 formed in the sides of the shaft 22 whereby rotation of the driving shaft will be imparted to the hollow shaft and the driving shaft may move axially with respect to the hollow shaft. The ends of the pin or stud 56 rests on the upper edge of a ring 58 which is mounted loosely in the sleeve 21 and is provided with a handle 59 extending radially outward from the ring and playing in an inclined slot 60 formed in the sleeve 21, as clearly shown in Fig. 8. Obviously, when the handle 59 is moved along the slot 60, the ring 58 will be caused to move axially or longitudinally of the sleeve 21 and will, consequently, move the shaft 20 upwardly or downwardly accordingly as the ring is moved in one or the other direction. When the shaft 20 is moved upwardly, the clutch cone 55 will be raised against the tension of the spring 54 and the clutch will, consequently, be opened so that the wiper will not be operated but when the shaft 20 is permitted to move downwardly the spring will expand and will maintain the clutch cone in the working position. Preferably, the handle 59 has secured thereto an outer ring or collar 61 which encircles the sleeve 21 and covers the slot 60, thereby guarding the slot 60 from the entrance of dirt or other matter which might tend to clog the action and also impart a neat ornamental finish to the device.

The coupling sleeve 52 has an annular flange 62 at its lower end which rests on the upper end of a cylindrical casing 63 which may be the upstanding arm of a T-fitting and the sleeve 52 is held on the arm 63 by a cap 64, as shown in Fig. 8, and as will be readily understood. In the lower portion of the arm 63 is journaled a shaft 65 having a beveled pinion 66 on its lower end and having its upper end portion enlarged and provided with a flared bore, as shown at 67, whereby a clutch chamber or cup is provided to cooperate with the clutch cone 55. When the cone 55 is in its lowered position, shown in Fig. 8, the shaft 65 will be coupled to the main shaft 20 and, consequently, motion will be imparted to the wiper driving mechanism.

The beveled pinion 66 is disposed within the main body 68 of the T-fitting and meshes with a beveled pinion 69, also housed within said fitting and secured upon a shaft 70 which is journaled axially in the said member. Ordinarily, the speedometer of the automobile is arranged to be driven from a stub shaft 71 which is actuated directly by the transmission of the vehicle, one element of the transmission being indicated at 72 in Fig. 8. In the practice of my invention, the speedometer driving shaft is removed and the shaft 70 is substituted therefor and engaged with a stub shaft 71, as shown. The outer end of the shaft 70 is constructed with a notch 73 so that the speedometer shaft may be engaged therewith and, consequently, driven from the transmission and the adjacent end of the T-fitting is suitably formed to provide the proper support and bearing for the speedometer shaft.

The eccentric 33 of the gear 35 fits closely within the circular central opening of the pinion 32 and the rotation of the flexible driving shaft 20 is imparted to the gear 35 through the pinion 23 in an obvious manner. The eccentric holds the side of the pinion 32 at one point to the ring gear 29 but as the eccentric turns about the axis of the gear 35 the pinion 32 will be moved from the ring gear and will be given a part turn, being turned only the distance of one tooth at each complete rotation of the eccentric and, therefore, the eccentric must make forty-nine complete revolutions to turn the pinion one complete revolution, thereby effecting a very decided reduction in speed from the speed of the shaft 70 to the speed of the pinion 32. The notch 30 in the ring gear is so formed that the tendency of the gear to rotate with the pinion 32 when influenced by the shaft 20 will carry the notch into engagement with the detent 31 and, consequently, the ring will be held stationary so that the resulting action is to effect a slow rolling of the pinion 32 upon the ring gear. The described engagement between the pinion 32 and the disks 39 and 42 causes the disks and the segment 43 to turn with the pinion and the meshing of the segment with the rack 44 will cause the rack to move first in one direction and then in the opposite direction in a well known manner. The reciprocation of the rack is transmitted directly to the rods 14 which, of course, cause oscillation of the pinions 12 and the wiper shafts 5 so that the wipers are rocked or oscillated over the windshield. Obviously, any attempt to rock the wiper shafts in the same direction as motion is imparted thereto by the operation of the flexible shaft 20 will be frustrated by the engagement of the detent 31 with the recess 30 and the working parts will simply be locked. However, the wipers lie normally in a horizontal position and when power driven are swung upwardly in a known direction so that, if the driver of the car for any reason desires to momentarily operate the wiper by hand, he swings the handle 48 in a manner to move the wiper in a direction opposite to that in which it would be moved by the power shaft so that the gear ring 29 will then move with the pinion 32 and in a direction to carry the notch 30 away from the working end of the detent 31, so that any sudden deposit which might be made upon the windshield to interfere with the clear vision of the operator may be removed without requiring the device to be thrown into gear with the transmission and without destroying or affecting the operativeness of the device. The device will take up very little room upon the windshield or in the car and the flexibility of the main shaft and its sheath facilitate the adjustment and placing of the same so as to be operatively connected with the transmission and accommodate variations in the location of the transmission or its relation to other parts of the vehicle. The clutch mechanism is exceedingly simple and performs the clutching operation at a point near the transmission while it is controlled at a distant point adjacent the instrument board of the vehicle. The presence of large operating elements within the car which will take up space and possibly interfere with the view of the other instruments upon the instrument board is thereby avoided while a highly efficient clutch control is furnished.

It is also to be noted that the device offers no appreciable obstruction to the field of vision, the highest dimension in the field of vision being only about three-eighths of an inch.

Having thus described the invention, I claim:

1. In a windshield wiper mechanism, the combination of a driven shaft, a casing, a rack mounted within said casing for reciprocation and provided at its end with a T-shaped notch, a rod slidably supported in the casing and having a T head engaged with said T notch, gearing connecting the outer end of the rod with the driven shaft, and speed reduction gear mounted in the casing for reciprocating the rack.

2. In a windshield wiper mechanism, the combination of a driven shaft, a casing, a rack mounted within said casing for reciprocation and provided at its end with a T-shaped notch, a rod slidably supported in the casing and having a T-head engaged with said T notch, gearing connecting the outer end of the rod with the driven shaft, speed reduction gear mounted in the casing for reciprocating the rack, said speed reduction gearing including a gear ring, and yieldable means for holding said gear ring against movement in one direction but yielding to permit movement thereof in the opposite direction whereby the driven shaft may be actuated by hand.

3. In a windshield wiper mechanism, the combination of a driven shaft, a casing, a rod slidably supported within said casing at its inner end and slidably supported at its outer end and geared to the shaft, a handle on the rear end of the shaft, and speed-reducing gearing within the casing operatively connected with the rod whereby the rod may be reciprocated under power, said speed-reducing gearing including an element normally stationary to prevent actuation of the shaft by hand, and yieldable means engaging said element to prevent movement in one direction and permit movement in the opposite direction whereby the shaft may be actuated by hand.

4. In a windshield wiper mechanism, the combination of a shaft mounted for oscillation, a stationary internal gear ring, a pinion disposed loosely within said ring to mesh therewith and having fewer teeth than the ring and provided with a central circular opening, the pinion having a diametrical groove in one face, a driving gear having a spindle provided with an eccentric fitting closely within the central opening of said pinion, a disk provided on one face with lugs engaging the groove in the pinion to rotate therewith, said disk having similar lugs on its opposite face, a second disk having peripheral notches engaging the last-mentioned lugs on the first disk to rotate therewith, a segment carried by the second disk, a rack actuated by the segment, and operative connections between the rack and the shaft.

In testimony whereof I affix my signature.

CARROLL H. BERILL.